(12) United States Patent
Sarukawa

(10) Patent No.: US 7,834,080 B2
(45) Date of Patent: Nov. 16, 2010

(54) PROCESS FOR PRODUCING GLASS FIBER-REINFORCED POLYAMIDE RESIN COMPOSITION

(75) Inventor: Koji Sarukawa, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 51 days.

(21) Appl. No.: 12/281,062

(22) PCT Filed: Mar. 1, 2007

(86) PCT No.: PCT/JP2007/053959

§ 371 (c)(1),
(2), (4) Date: Aug. 28, 2008

(87) PCT Pub. No.: WO2007/105497

PCT Pub. Date: Sep. 20, 2007

(65) Prior Publication Data

US 2009/0069499 A1    Mar. 12, 2009

(30) Foreign Application Priority Data

Mar. 13, 2006   (JP)   ............... 2006-068154

(51) Int. Cl.
  C08K 3/40   (2006.01)
(52) U.S. Cl. .................... 524/494; 523/222
(58) Field of Classification Search ........... 524/494; 523/222

See application file for complete search history.

(56) References Cited

U.S. PATENT DOCUMENTS 3,742,106 A   6/1973   Price
4,559,262 A   12/1985  Cogswell et al.
6,291,064 B1   9/2001  Kadowaki et al.

FOREIGN PATENT DOCUMENTS

| EP | 0 056 703 | 7/1982 |
|---|---|---|
| JP | 46-4545 | 11/1971 |
| JP | 63-37694 | 7/1988 |
| JP | 05-169445 | 7/1993 |
| JP | 06-254850 | 9/1994 |
| JP | 2000-37723 | 2/2000 |
| JP | 2003-175512 | 6/2003 |
| JP | 2006-016463 | 1/2006 |

OTHER PUBLICATIONS

English Language Abstract of JP 2000-37723, (2000).
English Language Abstract of JP 2003-175512, (2003).
English Language Abstract of EP 0 056 703, (1982).
English Language Abstract of JP 2006-016463, (2006).
English Language Abstract of JP 06-254850, (1994).
English Language Abstract of JP 05-169445, (1993).

Primary Examiner—Edward J Cain
(74) Attorney, Agent, or Firm—Greenblum & Bernstein P.L.C.

(57) ABSTRACT

The present invention provides a process for producing a polyamide resin composition, comprising the steps of: impregnating a molten polyamide resin into glass fiber rovings; taking off the polyamide-impregnated glass fiber rovings during twisting thereof to provide a strand; and pelletizing the strand to provide a resin composition, wherein a melt viscosity of the polyamide resin is set to fall within a particular range. According to the present invention, there can be provided a process for producing a glass fiber-reinforced polyamide resin composition excellent in the impregnation of the resin into the glass fiber rovings and capable of offering a molding excellent in mechanical strength and color tone.

6 Claims, No Drawings

PROCESS FOR PRODUCING GLASS FIBER-REINFORCED POLYAMIDE RESIN COMPOSITION

TECHNICAL FIELD

The present invention relates to a process for producing a polyamide resin composition, comprising the steps of: impregnating a polyamide resin into glass fiber rovings and taking off the resin-impregnated glass fiber rovings while twisting to provide a strand. More specifically, the present invention relates to a process for producing a polyamide resin composition having the resin sufficiently impregnated into glass fiber rovings and capable of offering a molding excellent in mechanical strength and color tone.

BACKGROUND ART

A glass fiber-reinforced polyamide resin is used in various industrial fields, taking advantage of its excellent mechanical strength. The glass fiber-reinforced polyamide resin is typically produced by a process involving kneading the polyamide resin with short fibers such as chopped strand using an extruder. However, this process has a problem that it cannot serve the need for a high level of mechanical characteristics because the glass fibers are shortened during the kneading in the extruder.

In response, it has recently been discussed to lengthen the reinforcement fiber in order to sufficiently bring out the native performance of a fibrous reinforcement material. A long glass fiber-reinforced polyamide resin can be obtained, for example, using a pultrusion process involving employing glass fiber rovings to impregnate a resin into the glass fiber rovings while taking off a strand. The polyamide resin composition obtained by this process is excellent in mechanical strength, as compared to the above-described short fiber-reinforced polyamide resin (for example, Patent Documents 1 and 2).

However, the above method requires considerably reducing the melt viscosity of the polyamide resin during production for sufficient impregnation of the resin into the glass fiber rovings. For that reason, it is necessary to set the melt temperature at a high level during production or use a polyamide resin having a low molecular weight. As a result, a problem is posed that long-term performances such as vibration fatigue resistance are not sufficient.

It is also necessary to slow the speed of taking off the resin strand in view of the impregnation of the resin into the glass fiber rovings. Thus, there is a problem that the polyamide resin has a longer melt residence time, which results in deteriorated color tone of the polyamide resin composition.

On the other hand, there is a production process involving impregnating a resin into a reinforcement fiber and taking off the reinforcement fiber while twisting to provide a strand (for example, Patent Documents 3, 4, and 5).

The above technique can stably produce, for a long period of time, a fiber-reinforced resin strand excellent in flexibility and buckling resistance by imparting twisting to the resin strand to impregnate the resin sufficiently into the reinforcement fiber.

However, these documents give no indication of a process for obtaining a long fiber-reinforced polyamide resin composition excellent in color tone, which is a challenge with a polyamide resin.

Patent Document 1: Japanese Unexamined Patent Application Publication No. 46-004545 (corresponding U.S. Pat. No. 3,742,106)
Patent Document 2: Japanese Unexamined Patent Application Publication No. 2006-016463
Patent Document 3: Japanese Unexamined Patent Application Publication No. 06-254850
Patent Document 4: Japanese Unexamined Patent Application Publication No. 05-169445
Patent Document 5: Japanese Unexamined Patent Application Publication No. 2003-175512

DISCLOSURE OF INVENTION

Problems to be Solved by the Invention

An object of the present invention is to provide a process for producing a polyamide resin composition which can have the resin sufficiently impregnated into glass fiber rovings and can offer a molding excellent in mechanical strength and color tone.

Means for Solving the Problems

As a result of intensive studies for solving the above-described problems, the present inventor has found that a polyamide resin composition having excellent impregnation of resin into glass fiber rovings and offering a molding excellent in color tone can be efficiently produced by a process for producing the polyamide resin composition, comprising the steps of:

impregnating a molten polyamide resin into glass fiber rovings;

taking off the polyamide-impregnated glass fiber rovings while twisting to provide a strand; and pelletizing the strand to provide a resin composition, wherein the melt viscosity of the polyamide resin sets to fall within a particular range.

In other words, the present invention is as follows:

[1] A process for producing a polyamide resin composition comprising a polyamide resin and a glass fiber, comprising the steps of:

impregnating a molten polyamide resin into glass fiber rovings;

taking off the polyamide-impregnated glass fiber rovings during twisting thereof to provide a strand; and pelletizing the strand to provide the resin composition, wherein the polyamide resin has a melt viscosity of from 15 to 40 (Pa·s) at a shear rate of 1,000 sec$^{-1}$ at a temperature during the impregnation.

[2] The process for producing the polyamide resin composition according to item [1], wherein production conditions are controlled so that a concentration of the glass fiber in the polyamide resin composition is set to be from 20 to 80% by mass.

[3] The process for producing the polyamide resin composition according to item [1] or [2], wherein the production conditions are controlled so that an average glass fiber length in the polyamide resin composition is set to be from 3 to 20 mm.

[4] The process for producing the polyamide resin composition according to any one of items [1] to [3], wherein the polyamide resin before melting has a moisture content of from 0.05 to 0.5% by mass.

[5] The process for producing the polyamide resin composition according to any one of items [1] to [4], wherein the polyamide resin has a relative viscosity in sulfuric acid (ηr) (at 25° C., in 96% sulfuric acid solution) of 2.60 or more.

[6] A polyamide resin composition obtained by the process according to any one of items 1 to 5.

Advantageous Effects of the Invention

According to the present invention, setting the melt viscosity of a polyamide resin to fall within a particular range provides the polyamide resin composition not only with excellent impregnation of resin into the glass fiber but also capable of offering a molding excellent in color tone. Thus, the composition can be suitably used in components in the fields of automobiles, home equipment, furnishings, industries, and the like, which require mechanical strength and coloring and coating.

BEST MODE FOR CARRYING OUT THE INVENTION

The present invention is described below in detail.

As the polyamide resin used in the present invention, there may be employed a common polyamide. Examples thereof may include homopolymers such as polyamide 6, polyamide 610, polyamide 612, polyamide 11, polyamide 12, polyamide MXD6, a polyamide obtained by polymerizing hexamethylenediamine and isophthalic acid (polyamide 6I), and a polyamide obtained by polymerizing isophthalic acid and bis(3-methyl-4-aminocyclohexyl)methane (polyamide PACMI);

a polyamide obtained by polymerizing adipic acid, isophthalic acid, and hexamethylenediamine (polyamide 66/6I copolymer);

a polyamide obtained by polymerizing adipic acid, terephthalic acid, and hexamethylenediamine (polyamide 66/6T copolymer);

a polyamide obtained by polymerizing isophthalic acid, terephthalic acid, and hexamethylenediamine (polyamide 6I/6T copolymer);

a polyamide obtained by polymerizing adipic acid, isophthalic acid, terephthalic acid, and hexamethylenediamine (polyamide 66/6I/6T copolymer);

a polyamide obtained by polymerizing terephthalic acid, 2,2,4-trimethylhexamethylenediamine, and 2,4,4-trimethylhexamethylenediamine (polyamide TMDT copolymer);

a polyamide obtained by polymerizing terephthalic acid and nonanediamine (polyamide 9T);

a copolyamide obtained by polymerizing isophthalic acid, terephthalic acid, hexamethylenediamine, and bis(3-methyl-4-aminocyclohexyl)methane;

a blend of a copolyamide obtained by polymerizing isophthalic acid, terephthalic acid, hexamethylenediamine, and bis(3-methyl-4-aminocyclohexyl)methane with polyamide 6; and a blend of polyamide MXD6 and polyamide 66.

Among others, semiaromatic polyamides such as polyamide 66/6T copolymer and polyamide 66/6T/6I copolymer have high melting points and are suitable for components requiring higher heat resistance, for example, components in an automobile engine room. In addition, semiaromatic polyamides such as polyamide 66/6I copolymer and polyamide MXD6 and blends of these semiaromatic polyamides and other aliphatic polyamides easily provide moldings excellent in appearance even in the presence of glass fibers added thereto because the crystallization temperatures can be controlled as appropriate by the copolymerization or blending ratios thereof.

The moisture content of the polyamide resin used in the present invention is not particularly limited. Preferably, the moisture content is from 0.05% by mass or more to obtain a composition excellent in color tone and 0.5% by mass or less to suppress a reduction in the molecular weight of the polyamide due to hydrolysis. The percentage is more preferably from 0.05 to 0.3% by mass, still more preferably from 0.05 to 0.25% by mass.

A method for adjusting the moisture content of the polyamide resin may be the known method. Examples thereof may include a method involving, in cooling/solidifying the melt-polymerized polyamide resin with water for pelletization, dipping the resin longer than usual in a water bath, a method involving blending the pellet with water before stirring, a method involving spraying misty water on the pellet, a method involving squirting water vapor onto the pellet, a method involving causing the pellet to take up moisture naturally in the air or the like. Among others, the method involving spraying misty water on the pellet is particularly preferable because it can conveniently adjust the moisture content to any value and can reduce the uneven distribution of moisture. It is also preferable from the point of view of preventing oxygen adsorption to adjust the moisture content at a stage as early as possible after the pelletization.

The relative viscosity in sulfuric acid ($\eta r$) of the polyamide resin used in the present invention is not particularly limited. The relative viscosity is preferably 2.60 or more to obtain a composition excellent in long-term performances such as vibration fatigue resistance. The viscosity is more preferably from 2.60 to 4.50, still more preferably from 2.60 to 4.00.

As used herein, the relative viscosity in sulfuric acid ($\eta r$) of polyamide resin is measured at 25° C. using an Ostwald viscometer and calculated by the following equation:

$$(\eta r) = \frac{\text{a time in seconds taken for flowing down of a polyamide resin solution}}{\text{a time in seconds taken for flowing down of a sulfuric acid solution}}$$

wherein the polyamide resin solution used is obtained by dissolving the polyamide resin in a 96% sulfuric acid solution so as to provide a concentration of 0.01 g/ml.

The glass fiber roving used in the present invention is not particularly limited provided that it is a roving obtained by bundling monofilaments. To enhance the interfacial adhesiveness between the glass fiber and polyamide resin, the roving has preferably been subjected to surface treatment with a coupling agent or the like.

The glass fiber roving suitably used in the present invention is that having been subjected to surface treatment with a sizing agent for use in polyamide resins. Here, the sizing agent preferably contains a sizing component for the purpose of sizing and a surface treatment component intended for adhesion with a polyamide resin.

The components of the sizing agent for glass fibers suitably used in the present invention are not particularly limited. The sizing agent most preferably comprises, as main components, a copolymer of maleic anhydride and an unsaturated monomer and an amino group-containing silane coupling agent in view of an improvement in mechanical characteristics.

Specific examples of the copolymer of maleic anhydride and an unsaturated monomer as a constituent of the sizing agent may include copolymers of maleic anhydride with unsaturated monomers such as styrene, α-methylstyrene, butadiene, isoprene, chloroprene, 2,3-dichlorobutadiene, 1,3-pentadiene, cyclooctadiene or the like.

Among others, a copolymer of maleic anhydride with butadiene or styrene is particularly preferable. In addition, these monomers may be used in a combination of two or more kinds thereof. The copolymer of maleic anhydride with an unsaturated monomer preferably has an average molecular weight of 2,000 or more. The ratio of maleic anhydride to unsaturated monomer is not particularly limited. Further, an acrylic copolymer or a urethane polymer may be used in combination in addition to the maleic anhydride copolymer.

As the silane coupling agent, another component of the sizing agent, there may be used a silane coupling agent conventionally employed for the surface treatment of glass fiber.

Specific examples thereof may include aminosilane coupling agents such as γ-aminopropyltrimethoxysilane, γ-aminopropyltriethoxysilane, N-(β-aminoethyl)-γ-aminopropylmethyldimethoxysilane, N-(β-aminoethyl)aminopropyltrimethoxysilane, and N-(β-aminoethyl)aminopropyltriethoxysilane;

epoxysilane coupling agents such as γ-glycidoxypropylmethyldiethoxysilane, γ-glycidoxypropyltrimethoxysilane, and γ-glycidoxypropyltriethoxysilane; methacryloxysilane coupling agents such as γ-methacryloxypropylmethyldimethoxysilane, γ-methacryloxypropyltrimethoxysilane, γ-methacryloxypropylmethyldiethoxysilane, and γ-methacryloxypropyltriethoxysilane; and vinylsilane coupling agents such as vinyltrimethoxysilane, vinyltriethoxysilane, and vinyltris(β-methoxyethoxy)silane or the like.

These coupling agents may be also used in a combination of two or more kinds thereof.

Among these agents, aminosilane coupling agents are preferable particularly in view of affinity to polyamide resin; among others, most preferred are γ-aminopropyltriethoxysilane and N-(β-aminoethyl)-γ-aminopropyltriethoxysilane. The silane coupling agent is preferably used in an amount of from 0.01 to 20 parts by mass, more preferably from 5 to 20 parts by mass, still more preferably from 10 to 20 parts by mass, based on 100 parts by mass of the maleic anhydride copolymer.

The maleic anhydride copolymer and silane coupling agent are typically mixed in a water solvent and used as a sizing agent. A surfactant, a lubricant, a softener, an antistatic agent, and the like may be further added, if necessary.

An average fiber diameter of the glass fiber is not particularly limited, and is preferably 5 μm or more in view of bundlability and resin impregnation and preferably 20 μm or less in view of an improvement in mechanical strength; more preferred is an average diameter of from 8 to 17 μm. The number of glass fibers bundled is also not particularly limited. In view of productivity, preferred is a glass fiber roving in which 1,000 to 10,000, more preferably 1,500 to 8,000, still more preferably 2,000 to 6,000 monofilaments are bundled.

The glass fiber concentration in the polyamide resin composition obtained by the production process according to the present invention is preferably 20% by mass or more to achieve sufficient mechanical strength and preferably 80% by mass or less to obtain a resin composition having the resin sufficiently impregnated into the glass fiber rovings and offering an excellent molding appearance. More preferred is the range from 25 to 75% by mass, still more preferably from 30 to 70% by mass.

The weight average glass fiber length in the polyamide resin composition obtained by the production process according to the present invention is preferably 3 mm or more in view of mechanical properties and preferably 20 mm or less in view of the dispersibility of glass fibers during molding. More preferred is the range from 3 to 15 mm, still more preferably from 5 to 12 mm.

As used herein, the weight average glass fiber length is calculated according to the following equation on the basis of values obtained by the measurement of length of 400 glass fibers. The glass fibers are arbitrarily chosen by observation under a light microscope and use of an image analysis apparatus after only the polyamide resin in the polyamide resin composition has been burned in an electric muffle furnace at 600° C.

$$\text{Weight average glass fiber length} = \Sigma Wi^2 / \Sigma Li$$

(where $L1, L2, \ldots L400$ are each the length of an individual glass fiber and $W1, W2, \ldots W400$ are each the weight of an individual glass fiber.)

Various additives may be also blended as needed in the resin composition according to the present invention.

Examples of the additives may include a heat stabilizer for polyamides such as a copper compound and a phosphorus compound; an oxidative degradation inhibitor such as a hindered phenol and a hindered amine; a light stabilizer such as a manganese compound; a nucleating agent such as talc and boron nitride; a lubricant such as a higher fatty acid metal salt typified by a metal stearate; a mineral filler such as calcium carbonate, wollastonite, kaolin, calcined kaolin, and mica; a colorant such as carbon black, titanium dioxide, an azine dye, and a phthalocyanine dye; a plasticizer; an antistatic agent; a flame retardant; and a thermoplastic resin other than polyamide resins, or the like.

The process for producing the polyamide resin composition according to the present invention comprises the steps of: impregnating a molten polyamide resin into glass fiber rovings; and taking off the resin-impregnated glass fiber rovings while twisting to provide a strand.

The above process can shorten the melt residence time of the resin because it can take off the strand at high speed, thereby enabling the yellow discoloration of the resin composition to be suppressed. The process also reduces the incorporation of air into the resin composition because it can cause the resin to be sufficiently impregnated into the glass fiber rovings. Thus, the process is favorable in that it can suppress the yellow discoloration of the molding due to thermal oxidation during molding and the excessive breakage of the fibers.

Specific examples of the process for impregnating the molten polyamide resin into the glass fiber rovings include a process involving supplying the polyamide resin molten in an extruder to an impregnation die provided for the extruder and passing the fiber rovings through the die. In the impregnation die are preferably mounted several rolls for opening the glass fibers to facilitate the impregnation of the resin.

The resin-impregnated glass fiber rovings drawn from the outlet of the impregnation die are dipped in a water bath and then twisted while performing the take-off using a twisting machine to provide the strand. The strand is then cut using a cutter for pelletization.

A process for twisting the resin-impregnated glass fiber rovings can be exemplified by a method involving passing the resin-impregnated glass fiber rovings through between rotating rolls opposite placed with the angles of the roll axes shifted to each other.

Methods for adjusting the glass fiber concentration include a method involving changing the number of monofilaments of a glass fiber roving bundled, a method involving changing the number of glass fiber rovings supplied, and a method involving changing the nozzle diameter to alter the pellet diameter.

Methods for adjusting the weight average glass fiber length include a method involving, in pelletizing the polyamide resin composition, changing the pellet length and a method involving, in twisting, changing the twisting pitch.

The melt viscosity of the polyamide resin used in the present invention is 15 (Pa·s) or more in view of the color tone of a resultant resin composition and 40 (Pa·s) or less in view of the impregnation of the resin into glass fiber rovings. Preferred is from 17 to 38 (Pa·s), more preferably from 20 to 35 (Pa·s). A method for achieving such a melt viscosity of the polyamide is not particularly limited, and can be exemplified by a method involving increasing the melt temperature in such a range that the effect of degrading the polyamide resin is not caused and a method involving controlling the molecular weight of the resin or the moisture content of the resin before melting.

As used herein, the melt viscosity of the polyamide resin is a melt viscosity obtained by measurement under conditions of the melt temperature of the polyamide resin during impregnation and a shear rate of $1,000$ $sec^{-1}$, which can be measured using the common capillary rheometer. By way of example, the measurements are performed on the capillary rheometer using two or more orifices having different diameter to length ratios; and a tube length-corrected value is determined from the measured values. As used herein, the melt temperature of the polyamide resin during impregnation is defined as the temperature of a barrel closest to an impregnation die of an extruder. When the melt viscosity is measured, the temperature of the capillary rheometer barrel is used as the melt temperature.

Even when the above-exemplified various additives are blended in a polyamide resin before melting, the polyamide resin containing such additives preferably has a melt viscosity within the above range.

The polyamide resin composition according to the present invention can be used in the known molding processes such as, for example, injection molding, extrusion, blowing, press molding or the like. In a screw molding machine typically used for injection molding or extrusion, the shapes of the nozzle and gate are preferably enlarged to suppress the failure of reinforcement fibers. Use of a molding machine screw in which consideration is given to the fiber dispersibility is preferable because it can provide high mechanical strength.

EXAMPLES

The present invention will be described in further detail based on the following Examples. However, the invention is not intended to be limited by these Examples in any manner. In addition, the measurement methods and raw materials used in Examples and Comparative Examples are described below.

Measurement of the Glass Fiber Concentration

The polyamide resin in 2 g of a resultant polyamide resin composition was burned in an electric muffle furnace (Model FP-31 manufactured by Yamato Scientific Co. Ltd.) according to ISO 3451; assuming that the resultant ash represents glass fibers, the concentration of the fibers was calculated.

Measurement of relative viscosity in sulfuric acid

In 100 ml of 96% sulfuric acid was dissolved 1 g of a polyamide resin, followed by subjecting the resultant polyamide solution to measurement in an environment of 25° C. using an Ostwald viscometer to calculate the relative viscosity in sulfuric acid according to the following equation.

The relative viscosity in sulfuric acid of a polyamide resin ($\eta r$)=(a time in seconds taken for flowing down of a polyamide solution)/(a time in seconds taken for flowing down of a sulfuric acid solution)

Measurement of Melt Viscosity

The melt shear viscosity of a polyamide was measured at the melt temperature during impregnation and a shear rate of $1,000^{-1}$ according to JIS K 7199 using a melt viscometer (Twin Capillary Rheometer (trade name) Model RH7-2 manufactured by Rosand). In the measurements, two orifices were used which had a capillary diameter of 1.0 mm, a capillary entrance angle of 180 degree, and length to diameter ratios (L/D) of 16 and 0.25, respectively; and a tube length-corrected value determined from the measured values was adopted as the melt viscosity.

Measurement of the Polyamide Resin Moisture Content

The moisture content of a polyamide resin pellet before melting was measured according to JIS K 7251 using Moisture Meter (Model CA-06) (Carl Fischer method, manufactured by Mitsubishi Chemical Corporation).

Measurement of Impregnation Property

One end of a resultant polyamide resin composition pellet (length: 10 mm) (the cut surface of a strand) was dipped for 30 minutes in a propanol solution of the color indicator methyl red (having a color developing property of methyl red improved by the adjustment of pH using 1 ml of hydrochloric acid per 50 ml of the propanol solution of methyl red), for which the penetration state of the color indicator in the long direction of the pellet was then observed. The observation was performed for ten arbitrarily chosen pellets. There were counted pellets in which a color indicator penetration of 2 mm or more was seen in the long direction thereof to evaluate the superiority or inferiority of the impregnation property according to the following criteria. When the resin has been sufficiently impregnated into the glass fiber rovings, the propanol solution of methyl red does not penetrate into the pellet. Fewer pellets in which a penetration of 2 mm or more is observed show better impregnation of the resin into the glass fiber rovings.

| The number of pellets | Evaluation |
| --- | --- |
| 0 | Good |
| 1 to 5 | Moderate |
| 6 to 10 | Poor |

Measurement of Color Tones

The color tones of a resultant polyamide resin pellet and a molding piece thereof were measured according to JIS K 7105. Using a color difference meter (ND-300A (trade name) manufactured by Nippon Denshoku Industries Co., Ltd, light-projecting lens diameter: 30 mm), the color tone was evaluated at a measurement area of 30 mm diameter, relative to a standard white plate. The YI value indicates the degree of yellow coloration; a specimen with a lower value is closer to white and more favorable.

Note that the color tone of the pellet was measured by charging the pellet in a dedicated glass holder.

In addition, the molding piece used for the measurement was obtained by injection-molding into a flat plate (6 cm×9 cm, 3 mm thick) using an injection molding machine (FN-3000 (trade name), screw diameter: 40 mm, manufactured by Nissei Plastic Industrial Co., Ltd.). The injection molding was performed under molding conditions of a mold temperature of 80° C., an injection pressure of 65 MPa, an injection time of 5 sec., a cooling time of 25 sec., and a screw rotation number of 200 rpm by setting the cylinder temperature to a temperature 30° C. higher than the melting point of the polyamide resin.

Measurement of Charpy Impact Strength

A flat plate (15 cm×15 cm, 4 mm thick) was obtained in the same way as that described above (in the color tone measurement). From the resultant flat plate there was cut out a specimen (80 mm×10 mm, 4 mm thick) whose long side is in the flow direction of the resin during molding. The resultant specimen was notched, for which Charpy impact strength was then measured according to ISO 180.

Vibration Fatigue Resistance

An ASTM No. 1 specimen was prepared in the same way as that described above (in the color tone measurement). A tensile load was applied thereto using a sine wave having a frequency of 20 Hz in an environment of 120° C. employing a hydraulic servo fatigue testing machine (EHF-50-10-3 (trade name) manufactured by Saginomiya Seisakusho, Inc.) to determine stresses causing breakage at loading numbers of 1,000,000 and 5,000,000 according to JIS K7118. The higher the breaking stress is, the more excellent in vibration fatigue resistance.

Raw Materials

Polyamide Resins

A1: Polyamide 66 Resin
  Relative viscosity in sulfuric acid: 2.64
  Moisture content: 0.09% by mass
  Melting point: 260° C.
A2: Polyamide 66 Resin
  Relative viscosity in sulfuric acid: 2.50
  Moisture content: 0.09% by mass
  Melting point: 260° C.
A3: Polyamide 66 Resin
  Relative viscosity in sulfuric acid: 2.64
  Moisture content: 0.02% by mass
  Melting point: 260° C.
A4: Polyamide 66 Resin
  Relative viscosity in sulfuric acid: 2.64
  Moisture content: 0.52% by mass
  Melting point: 260° C.
A5: Polyamide 66/6I
  Relative viscosity in sulfuric acid: 2.20
  Moisture content: 0.06% by mass
  Melting point: 225° C.
A6: Polyamide 66/6
  Relative viscosity in sulfuric acid: 2.30
  Moisture content: 0.10% by mass
  Melting point: 245° C.

Glass Fiber Roving

Glass fiber roving (ER2400T-448N (trade name), fiber diameter: 17 μm, 2400TEX, manufactured by Nippon Electric Glass Co., Ltd.)

Example 1

A twin-screw extruder (ZSK25 (trade name) manufactured by Coperion Ltd.) was used to melt polyamide A1 at a melt temperature of 310° C. and a screw rotation number of 300 rpm, followed by supplying the molten resin to an impregnation die equipped with a roll for resin impregnation in a long fiber-reinforced resin production device (KOSLFP-212 manufactured by Kobe Steel, Ltd.). Two bundles of glass fiber rovings were then introduced from a roving platform into the impregnation die filled with the molten polyamide resin. The glass fiber rovings impregnated with the resin in the impregnation die were continuously drawn through a nozzle (nozzle diameter: 2.9 mm) to make into the form of one strand, which was cool-solidified in a water-cooled bath and then pelletized using a pelletizer. The resultant polyamide resin pellet (10 mm in length and 2.9 mm diameter) had a glass fiber concentration of 50% by mass and an average glass fiber length of 10.5 mm. When the strand was taken off, the rovings were twisted by passing through between rolls opposite placed with the angles of the roll axes shifted to each other. Here, the speed of taking off the strand was 60 m/min., and the twisting pitch was 28 mm. The results are shown in Table 1.

Example 2 and Comparative Examples 1 to 6

Polyamide resin compositions were obtained in the same way as that in Example 1 except for use of the conditions shown in Table 1. The results are shown in Table 1.

Example 3

A polyamide resin pellet (10 mm in length and 2.7 mm diameter) was obtained in the same way as that in Example 1 except for setting the number of glass fiber bundles used to one and changing the nozzle diameter to 2.7 mm to alter the glass fiber concentration. The results are shown in Table 1.

Example 4

A polyamide resin pellet (10 mm in length and 2.3 mm diameter) was obtained in the same way as that in Example 1 except for changing the nozzle diameter to 2.3 mm to alter the glass fiber concentration.

COMPARATIVE EXAMPLES 7 AND 8

Polyamide resin compositions were produced in the same way as that in Example 3 except for changing the melt temperatures to 330° C. and 290° C., respectively. The results are shown in Table 1.

Comparative Examples 9 and 10

Polyamide resin compositions were produced in the same way as that in Example 4 except for changing the melt temperatures to 330° C. and 290° C., respectively. The results are shown in Table 1.

Examples 5 and 6 and Comparative Examples 11 to 18

Polyamide resin compositions were produced in the same way as that in Example 1 except for use of the conditions shown in Table 2. The results are shown in Table 2.

Example 7 and Comparative Examples 19 and 20

Polyamide resin pellets were obtained in the same way as that in Example 1 except for employing as a polyamide resin a pellet in which calcium stearate was added on the surface of the polyamide A1 pellet with a blender and using the conditions shown in Table 2. Note that the addition amount of calcium stearate was 0.1 parts by weight based on 100 parts by weight of the polyamide resin. The results are shown in Table 2.

Examples 8 to 11 and Comparative Examples 21 to 28

Polyamide resin pellets were obtained in the same way as that in Example 1 except for use of the conditions shown in Table 3. The results are shown in Table 3.

The polyamide resin compositions obtained by the production processes of Examples are each excellent in the impregnation of resin into glass fiber rovings and the color tone, impact strength and vibration fatigue resistance of the molding piece.

The production processes of Comparative Examples did not enable pellets to be successfully produced because they each leaded to the generation of a large amount of gas generated by decomposition of the polyamide resin and increased the resistance of the strand in the take-off. Even when the pellet has been able to be produced, it provides a molding piece poor in the color tone and inferior in impact strength because of its poor impregnation property.

TABLE 1

|  | Ex. 1 | Ex. 2 | Comp. Ex. 1 | Comp. Ex. 2 | Comp. Ex. 3 | Comp. Ex. 4 | Comp. Ex. 5 |
| --- | --- | --- | --- | --- | --- | --- | --- |
| Polyamide resin | A1 | A1 | A1 | A1 | A1 | A1 | A1 |
| Relative viscosity in sulfuric acid (ηr) | 2.64 | 2.64 | 2.64 | 2.64 | 2.64 | 2.64 | 2.64 |
| Presence of a twisting step Presence: Yes, Absence: No | Yes | Yes | Yes | Yes | No | No | No |
| GF concentration (% by mass) | 50 | 50 | 50 | 50 | 50 | 50 | 50 |
| Molten resin temperature (° C.) | 310 | 310 | 330 | 290 | 310 | 310 | 330 |
| Melt viscosity (Pa·s) | 26 | 26 | 12 | 50 | 26 | 26 | 12 |
| Speed of taking off a strand (m/min) | 60 | 20 | 60 | 60 | 60 | 20 | 60 |
| Impregnation property | Good | Good | Not produced | Moderate | Not produced | Not produced | Not produced |
| YI value of a pellet | 13 | 15 | *1 | 12 | *2 | *2 | *1 |
| YI value of a molding piece | 15 | 17 |  | 20 |  |  |  |
| Charpy impact strength (notched) (kJ/m²) | 35 | 35 |  | 32 |  |  |  |
| Vibration fatigue resistance Breaking stress after 1 million cycles (MPa) | 65 | 64 |  | 64 |  |  |  |
| Vibration fatigue resistance Breaking stress after 5 million cycles (MPa) | 59 | 58 |  | 58 |  |  |  |

|  | Comp. Ex. 6 | Ex. 3 | Ex. 4 | Comp. Ex. 7 | Comp. Ex. 8 | Comp. Ex. 9 | Comp. Ex. 10 |
| --- | --- | --- | --- | --- | --- | --- | --- |
| Polyamide resin | A1 | A1 | A1 | A1 | A1 | A1 | A1 |
| Relative viscosity in sulfuric acid (ηr) | 2.64 | 2.64 | 2.64 | 2.64 | 2.64 | 2.64 | 2.64 |
| Presence of a twisting step Presence: Yes, Absence: No | No | Yes | Yes | Yes | Yes | Yes | Yes |
| GF concentration (% by mass) | 50 | 30 | 65 | 30 | 30 | 65 | 65 |
| Molten resin temperature (° C.) | 290 | 310 | 310 | 330 | 290 | 330 | 290 |
| Melt viscosity (Pa·s) | 50 | 26 | 26 | 12 | 50 | 12 | 50 |
| Speed of taking off a strand (m/min) | 60 | 60 | 60 | 60 | 60 | 60 | 60 |
| Impregnation property | Not produced | Good | Good | Not produced | Moderate | Not produced | Moderate |
| YI value of a pellet | *2 | 14 | 15 | *1 | 14 | *1 | 14 |
| YI value of a molding piece |  | 14 | 18 |  | 19 |  | 25 |
| Charpy impact strength (notched) (kJ/m²) |  | 25 | 42 |  | 22 |  | 38 |
| Vibration fatigue resistance Breaking stress after 1 million cycles (MPa) |  | 59 | 68 |  | 57 |  | 66 |
| Vibration fatigue resistance Breaking stress after 5 million cycles (MPa) |  | 53 | 62 |  | 52 |  | 59 |

Note:
*1 No pellets could be produced because of a large amount of gas generated by decomposition of polyamide resin.
*2 No pellets could be produced because of strong take-off resistance of strands.

TABLE 2

|  | Ex. 5 | Ex. 6 | Comp. Ex. 11 | Comp. Ex. 12 | Comp. Ex. 13 | Comp. Ex. 14 | Comp. Ex. 15 |
| --- | --- | --- | --- | --- | --- | --- | --- |
| Polyamide resin | A2 | A2 | A2 | A2 | A2 | A2 | A2 |
| Relative viscosity in sulfuric acid (ηr) | 2.50 | 2.50 | 2.50 | 2.50 | 2.50 | 2.50 | 2.50 |

TABLE 2-continued

| | | | | | | | |
|---|---|---|---|---|---|---|---|
| Presence of a twisting step Presence: Yes, Absence: No | Yes | Yes | Yes | Yes | No | No | No |
| GF concentration (% by mass) | 50 | 50 | 50 | 50 | 50 | 50 | 50 |
| Molten resin temperature (° C.) | 300 | 300 | 320 | 280 | 300 | 300 | 320 |
| Melt viscosity (Pa · s) | 30 | 30 | 14 | 62 | 30 | 30 | 14 |
| Speed of taking off a strand (m/min) | 60 | 20 | 60 | 60 | 60 | 20 | 60 |
| Impregnation property | Good | Good | Good | Moderate | Not produced | Poor | Not produced |
| YI value of a pellet | 10 | 12 | 20 | 9 | *2 | 14 | *2 |
| YI value of a molding piece | 11 | 14 | 22 | 17 | | 40 | |
| Charpy impact strength (notched) (kJ/m$^2$) | 37 | 37 | 37 | 35 | | 33 | |
| Vibration fatigue resistance Breaking stress after 1 million cycles (MPa) | 61 | 60 | 58 | 60 | | 60 | |
| Vibration fatigue resistance Breaking stress after 5 million cycles (MPa) | 55 | 54 | 52 | 54 | | 55 | |

| | Comp. Ex. 16 | Comp. Ex. 17 | Comp. Ex. 18 | Ex. 7 | Comp. Ex. 19 | Comp. Ex. 20 |
|---|---|---|---|---|---|---|
| Polyamide resin | A2 | A2 | A2 | A1 | A1 | A1 |
| Relative viscosity in sulfuric acid (ηr) | 2.50 | 2.50 | 2.50 | 2.64 | 2.64 | 2.64 |
| | | | | Calcium stearate added | | |
| Presence of a twisting step Presence: Yes, Absence: No | No | No | No | Yes | Yes | Yes |
| GF concentration (% by mass) | 50 | 50 | 50 | 50 | 50 | 50 |
| Molten resin temperature (° C.) | 320 | 280 | 280 | 310 | 330 | 290 |
| Melt viscosity (Pa · s) | 14 | 62 | 62 | 23 | 10 | 45 |
| Speed of taking off a strand (m/min) | 20 | 60 | 20 | 60 | 60 | 60 |
| Impregnation property | Moderate | Not produced | Not produced | Good | Not produced | Moderate |
| YI value of a pellet | 25 | *2 | *2 | 13 | *1 | 12 |
| YI value of a molding piece | 36 | | | 15 | | 20 |
| Charpy impact strength (notched) (kJ/m$^2$) | 34 | | | 36 | | 33 |
| Vibration fatigue resistance Breaking stress after 1 million cycles (MPa) | 57 | | | 62 | | 60 |
| Vibration fatigue resistance Breaking stress after 5 million cycles (MPa) | 51 | | | 56 | | 55 |

Note:
*1 No pellets could be produced because of a large amount of gas generated by decomposition of polyamide resin,
*2 No pellets could be produced because of strong take-off resistance of strands.

TABLE 3

| | Ex. 8 | Ex. 9 | Comp. Ex. 21 | Comp. Ex. 22 | Comp. Ex. 23 | Comp. Ex. 24 | Ex. 10 | Comp. Ex. 25 | Comp. Ex. 26 | Ex. 11 | Comp. Ex. 27 | Comp. Ex. 28 |
|---|---|---|---|---|---|---|---|---|---|---|---|---|
| Polyamide resin | A3 | A4 | A3 | A3 | A4 | A4 | A5 | A5 | A5 | A6 | A6 | A6 |
| Relative viscosity in sulfuric acid (ηr) | 2.64 | 2.64 | 2.64 | 2.64 | 2.64 | 2.64 | 2.20 | 2.20 | 2.20 | 2.30 | 2.30 | 2.30 |
| Presence of a twisting step Presence: Yes, Absence: No | Yes | Yes | Yes | Yes | Yes | Yes | Yes | Yes | Yes | Yes | Yes | Yes |
| GF concentration (% by mass) | 50 | 50 | 50 | 50 | 50 | 50 | 50 | 50 | 50 | 50 | 50 | 50 |
| Molten resin temperature (° C.) | 320 | 280 | 340 | 300 | 290 | 270 | 290 | 320 | 270 | 290 | 320 | 270 |
| Melt viscosity (Pa · s) | 30 | 16 | 14 | 55 | 8 | 45 | 31 | 9 | 55 | 26 | 10 | 45 |
| Speed of taking off a strand (m/min) | 60 | 60 | 60 | 60 | 60 | 60 | 60 | 60 | 60 | 60 | 60 | 60 |
| Impregnation property | Good | Moderate | Not produced | Moderate | Not produced | Poor | Good | Good | Moderate | Good | Good | Moderate |
| YI value of a pellet | 29 | 8 | *1 | 30 | *3 | 8 | 17 | 25 | 14 | 17 | 24 | 14 |
| YI value of a molding piece | 32 | 17 | | 40 | | 26 | 20 | 28 | 25 | 18 | 25 | 23 |
| Charpy impact strength (notched) (kJ/m$^2$) | 34 | 32 | | 34 | | 30 | — | — | — | — | — | — |
| Vibration fatigue resistance Breaking stress after 1 million cycles (MPa) | 64 | 63 | | 61 | | 63 | — | — | — | — | — | — |

TABLE 3-continued

|  | Ex. 8 | Ex. 9 | Comp. Ex. 21 | Comp. Ex. 22 | Comp. Ex. 23 | Comp. Ex. 24 | Ex. 10 | Comp. Ex. 25 | Comp. Ex. 26 | Ex. 11 | Comp. Ex. 27 | Comp. Ex. 28 |
|---|---|---|---|---|---|---|---|---|---|---|---|---|
| Vibration fatigue resistance Breaking stress after 5 million cycles (MPa) | 58 | 57 |  | 55 |  | 57 | — | — | — | — | — | — |

Note:
*1 No pellets could be produced because of a large amount of gas generated by decomposition of polyamide resin,
*2 No pellets could be produced because of strong take-off resistance of strands,
*3 No pellets could be produced because polyamide resin started to foam.

The polyamide resin composition according to the present invention is excellent in the color tone and mechanical strength of a molding thereof. Thus, the composition can be suitably used in components in the fields of automobiles, home equipment, furnishings, industries, and the like, which require mechanical strength and coloring and coating.

The invention claimed is:

1. A process for producing a polyamide resin composition comprising a polyamide resin and a glass fiber, comprising the steps of:
    impregnating a molten polyamide resin into glass fiber rovings;
    taking off the polyamide-impregnated glass fiber rovings during twisting thereof to provide a strand; and
    pelletizing the strand to provide the resin composition,
wherein the polyamide resin has a melt viscosity of from 15 to 40 (Pa·s) at a shear rate of 1,000 sec$^{-1}$ at a temperature during the impregnation.

2. The process for producing the polyamide resin composition according to claim 1, wherein production conditions are controlled so that a concentration of the glass fiber in the polyamide resin composition is set to be from 20 to 80% by mass.

3. The process for producing the polyamide resin composition according to claim 1, wherein the production conditions are controlled so that an average glass fiber length in the polyamide resin composition is set to be from 3 to 20 mm.

4. The process for producing the polyamide resin composition according to claim 1, wherein the polyamide resin before melting has a moisture content of from 0.05 to 0.5% by mass.

5. The process for producing the polyamide resin composition according to claim 1, wherein the polyamide resin has a relative viscosity in sulfuric acid ($\eta r$) (at 25° C., in 96% sulfuric acid solution) of 2.60 or more.

6. A polyamide resin composition obtained by the process according to claim 1.

* * * * *